(12) United States Patent
Hattori et al.

(10) Patent No.: US 11,928,064 B2
(45) Date of Patent: Mar. 12, 2024

(54) SENSOR AND SENSOR SYSTEM

(71) Applicant: HONDA MOTOR CO., LTD., Tokyo (JP)

(72) Inventors: Tomonari Hattori, Wako (JP); Jin Nishio, Wako (JP); Akihiro Suzuki, Wako (JP); Takashi Kawaura, Tokyo (JP); Sena Takekoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 71 days.

(21) Appl. No.: 17/681,805

(22) Filed: Feb. 27, 2022

(65) Prior Publication Data

US 2022/0318168 A1    Oct. 6, 2022

(30) Foreign Application Priority Data

Mar. 30, 2021   (JP) ................................. 2021-058284

(51) Int. Cl.
  *G06F 13/20* (2006.01)
  *G01M 3/18* (2006.01)
  *H01M 8/04664* (2016.01)

(52) U.S. Cl.
  CPC ............. *G06F 13/20* (2013.01); *G01M 3/186* (2013.01); *H01M 8/04679* (2013.01)

(58) Field of Classification Search
  None
  See application file for complete search history.

(56) References Cited

U.S. PATENT DOCUMENTS

| | | | | |
|---|---|---|---|---|
| 2003/0204337 A1* | 10/2003 | Beutelschiess | ....... | B60L 3/0023 702/51 |
| 2005/0154474 A1* | 7/2005 | Kauntz | ............... | B60R 16/0315 700/1 |
| 2006/0113198 A1* | 6/2006 | Sasaki | .................. | G01N 33/007 204/426 |
| 2010/0233562 A1* | 9/2010 | Kajiwara | .............. | G01M 3/007 429/444 |
| 2015/0149682 A1* | 5/2015 | Uemura | .................. | G06F 13/28 710/308 |

FOREIGN PATENT DOCUMENTS

JP    2015-136989 A    7/2015

* cited by examiner

*Primary Examiner* — Elias Mamo
(74) *Attorney, Agent, or Firm* — Carrier, Shende & Associates P.C.; Joseph P. Carrier; Jeffrey T. Gedeon

(57) ABSTRACT

A hydrogen sensor includes a communication terminal, a plurality of identification terminals, and an ID setting section. The communication terminal is connected to a first communication bus or a second communication bus, and communicate with a vehicle ECU. Each of the plurality of identification terminals is set to either an open state (OPEN) in which the identification terminal is not connected to any potential or a grounded state (GND) in which the identification terminal is connected to a ground potential. The ID setting section sets an identifier in either a standard format or an extended format, according to a difference in the communication bus to which the communication terminal is connected.

4 Claims, 10 Drawing Sheets

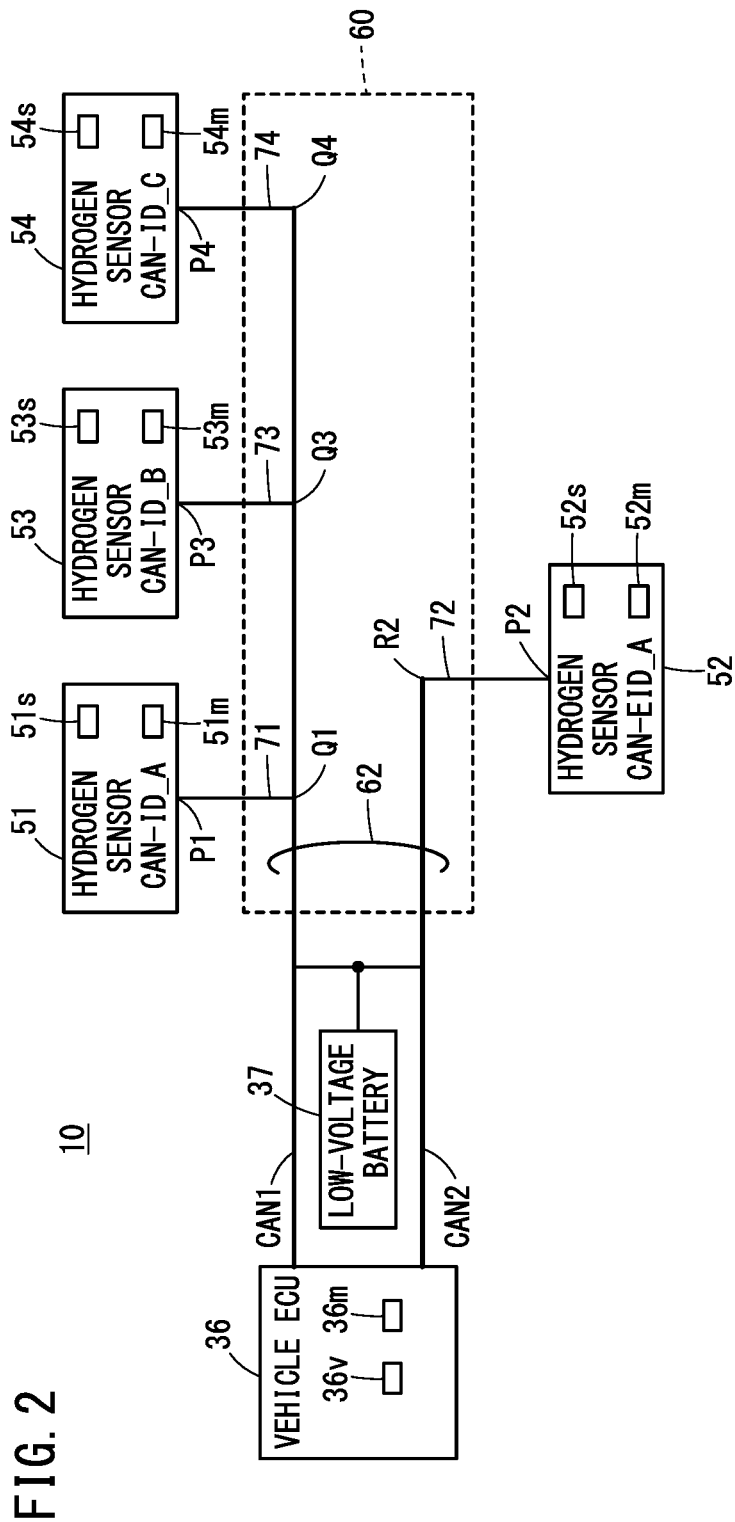

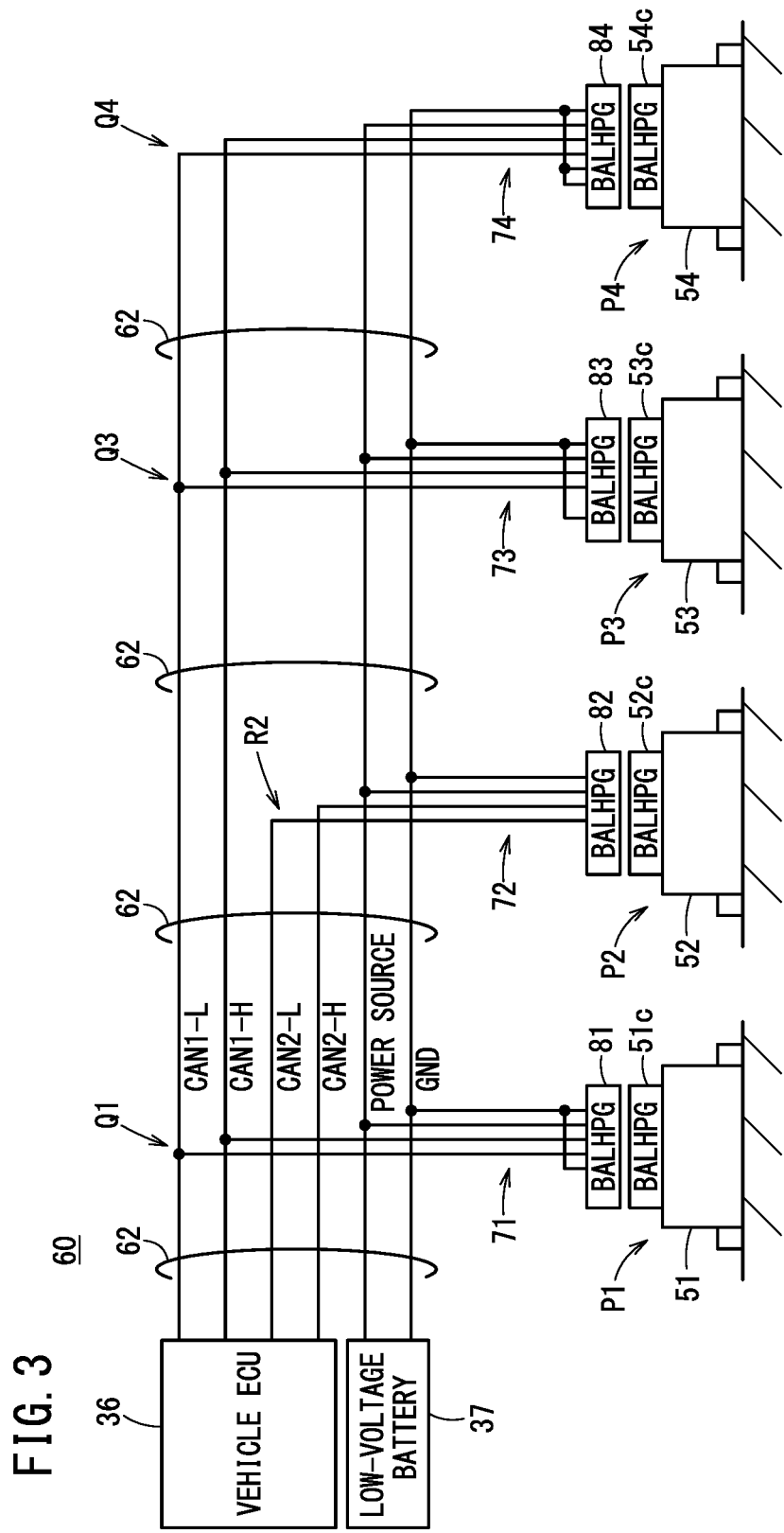

FIG. 4

| SENSOR ATTACHMENT POSITION | TERMINAL A | TERMINAL B | COMMUNICATION BUS | ID FORMAT | IDENTIFIER |
|---|---|---|---|---|---|
| FUEL CELL STACK (P1) | GND | OPEN | CAN1 | STANDARD ID | CAN-ID_A |
| FUEL CELL STACK (P2) | OPEN | OPEN | CAN2 | EXTENDED ID | CAN-EID_A |
| FIRST HYDROGEN TANK (P3) | OPEN | GND | CAN1 | STANDARD ID | CAN-ID_B |
| SECOND HYDROGEN TANK | GND | GND | CAN1 | STANDARD ID | CAN-ID_C |

FIG. 8

| SENSOR ATTACHMENT POSITION | TERMINAL A | TERMINAL B | COMMUNICATION BUS | ID FORMAT | IDENTIFIER |
|---|---|---|---|---|---|
| FUEL CELL STACK (P1) | GND | OPEN | CAN1 | STANDARD ID | CAN-ID_A |
| FUEL CELL STACK (P2) | OPEN | OPEN | CAN2 | EXTENDED ID | CAN-EID_A |
| FIRST HYDROGEN TANK (P3) | OPEN | GND | CAN1 | STANDARD ID | CAN-ID_B |
| SECOND HYDROGEN TANK (P4) | GND | GND | CAN2 | EXTENDED ID | CAN-EID_B |

FIG. 10

| CONTROL TARGET | CONTROL APPARATUS (ECU) | SENSOR ATTACHMENT POSITION | TERMINAL A | TERMINAL B | COMMUNICATION BUS | ID FORMAT | IDENTIFIER |
|---|---|---|---|---|---|---|---|
| FIRST CONTROL TARGET | FCECU136 | FIRST FUEL CELL STACK (P1) | GND | OPEN | CAN1 | STANDARD ID | CAN-ID_A |
| | | FIRST FUEL CELL STACK (P2) | OPEN | OPEN | CAN2 | EXTENDED ID | CAN-EID_A |
| | | FIRST HYDROGEN TANK (P3) | OPEN | GND | CAN1 | STANDARD ID | CAN-ID_B |
| | | SECOND HYDROGEN TANK (P4) | GND | GND | CAN1 | STANDARD ID | CAN-ID_C |
| SECOND CONTROL TARGET | FCECU236 | SECOND FUEL CELL STACK (P5) | GND | OPEN | CAN2 | EXTENDED ID | CAN-EID_B |
| | | SECOND FUEL CELL STACK (P6) | OPEN | OPEN | CAN1 | STANDARD ID | CAN-ID_D |
| | | THIRD HYDROGEN TANK (P7) | OPEN | GND | CAN2 | EXTENDED ID | CAN-EID_C |
| | | FOURTH HYDROGEN TANK (P8) | GND | GND | CAN2 | EXTENDED ID | CAN-EID_D |

US 11,928,064 B2

SENSOR AND SENSOR SYSTEM

CROSS-REFERENCE TO RELATED APPLICATIONS

This application is based upon and claims the benefit of priority from Japanese Patent Application No. 2021-058284 filed on Mar. 30, 2021, the contents of which are incorporated herein by reference.

BACKGROUND OF THE INVENTION

Field of the Invention

The present invention relates to a sensor and a sensor system.

Description of the Related Art

A conventional sensor identifier setting method is known for providing sensors each with a plurality of external terminals for setting an identifier and setting (assigning) an identifier of a senor according to a combination of voltage levels of these external sensors.

For example, in the on-board sensor identifier setting method disclosed in JP 2015-136989 A, a state in which the external sensor of an on-board sensor is connected to a ground potential (GND) is recognized as being low level. A state in which the potential of the external terminal is equal to a control power source voltage within the sensor, for example, is recognized as being high level. If one external terminal fails due to disconnection or the like (if a 1-bit failure occurs), there is a possibility of the identifier of the failing on-board sensor overlapping with the identifier of a normal on-board sensor. Therefore, in JP 2015-136989 A, the identifiers are not assigned to combinations including only one inverted voltage level (see paragraphs [0042] and [0047] of JP 2015-136989 A).

SUMMARY OF THE INVENTION

According to the identifier setting method such as described in JP 2015-136989 A, it is possible to prevent the identifier of a failing on-board sensor and the identifier of a normal on-board sensor from being confused for each other in the communication bus. Furthermore, the identifier assigned to a failing on-board sensor becomes unused in the communication bus. Therefore, there is an increased possibility that the failing on-board sensor can be identified.

However, in the identifier setting method such as described in JP 2015-136989 A, there is a problem that the number of sensors for which an identifier can be set is low. For example, in a case where a sensor having two external terminals is attached to a vehicle ECU, identifiers can be set for two sensors. The number of sensors for which identifiers can be set is up to half of the square of the number of external terminals. When three or more sensors are connected to the vehicle ECU, the vehicle ECU becomes unable to identify a failing sensor. When a sensor with a large number of external terminals is used to prevent overlapping identifiers, the installation space of connectors is increased. As a result, the cost is increased.

The present invention has been devised to solve the aforementioned problem.

An aspect of the present invention is a sensor that is connected to a control apparatus via one of two communication buses formed in a moving body and is identified by a unique identifier, the sensor including: a communication terminal that is connected to either one communication bus or another communication bus of the two communication buses, and communicates with the control apparatus; a plurality of identification terminals each having a connection state that is one of an open state in which the identification terminal is not connected to any potential and a grounded state in which the identification terminal is connected to a ground potential; and an identifier setting section that sets the identifier of the sensor according to the connection states of the plurality of identification terminals and a difference in the communication bus to which the communication terminal is connected, wherein the identifier setting section sets the identifier with a different pattern according to whether the communication bus to which the communication terminal is connected is the one communication bus or the other communication bus.

According to the present invention, it is possible to prevent confusion among identifiers even when the number of sensors for which identifiers are set is increased.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2 is a circuit block diagram of the sensor system;

FIG. 3 is a schematic physical wiring diagram of a vehicle harness including a trunk line and branch line assemblies, a vehicle ECU, and hydrogen sensors;

FIG. 4 is a descriptive diagram showing a relationship among identification terminals of the hydrogen sensors, communication buses, and identifiers set for the hydrogen sensors;

FIG. 8 is a descriptive diagram showing a relationship among identification terminals of the hydrogen sensors, communication buses, and identifiers set for the hydrogen sensors, according to the first modification;

FIG. 10 is a descriptive diagram showing a relationship among identification terminals of the hydrogen sensors, communication buses, and identifiers set for the hydrogen sensors, according to the second modification.

DESCRIPTION OF THE INVENTION

Figure 1A:
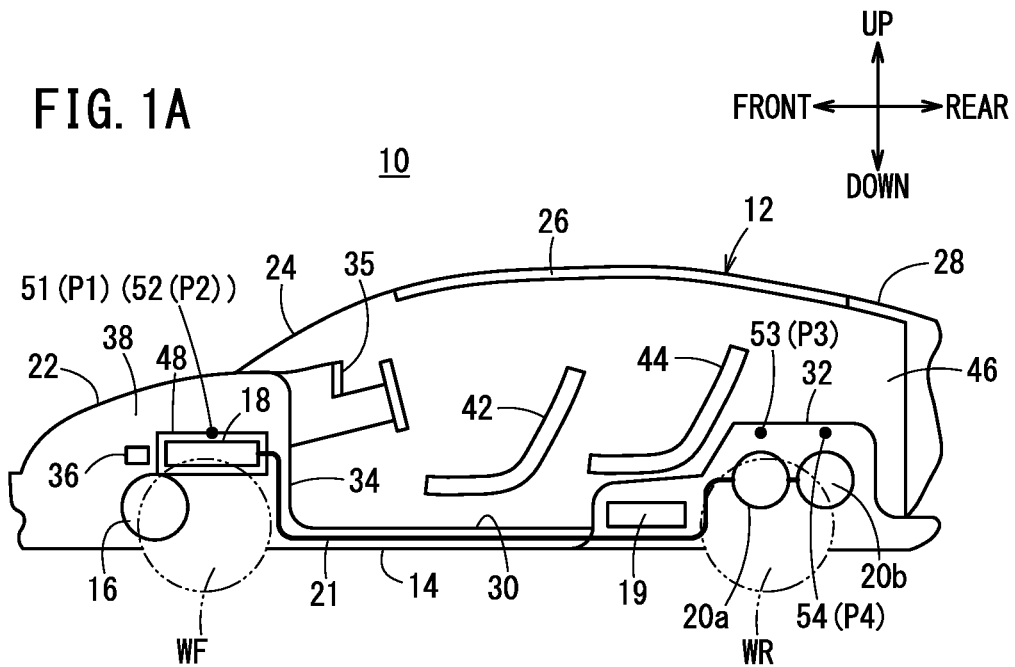
FIG. 1A is a side view showing a schematic configuration of a fuel cell vehicle having a sensor system according to the present embodiment loaded therein.
Figure 1B:
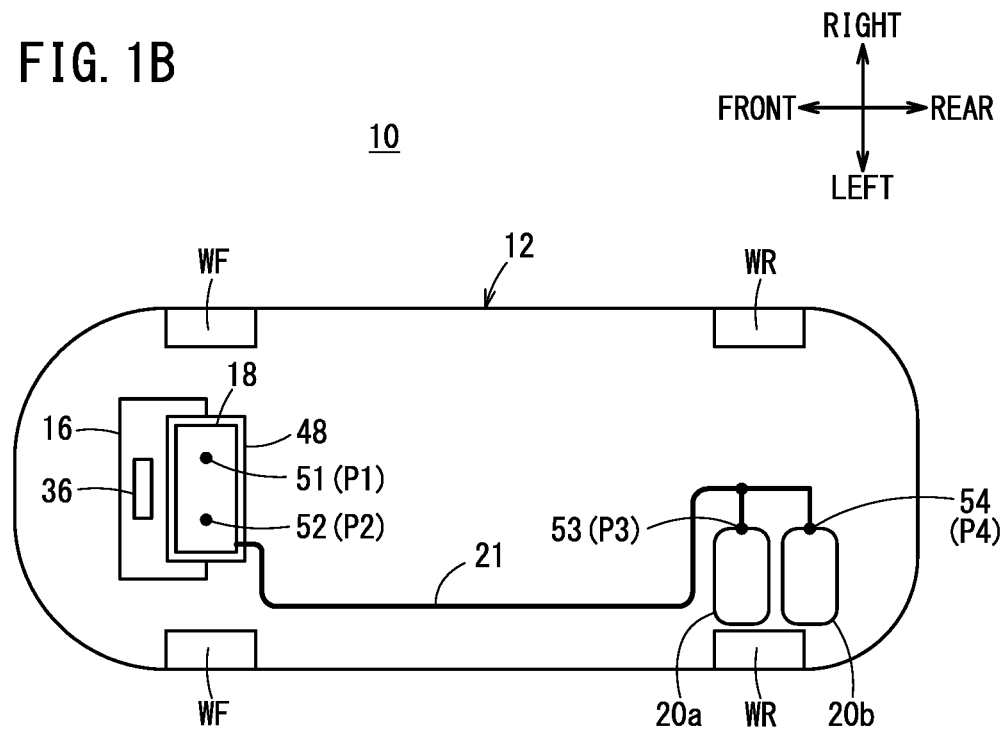
FIG. 1B is a top view showing a schematic configuration of the fuel cell vehicle.

FIG. 1A is a side view showing a schematic configuration of a fuel cell vehicle 12 having a sensor system 10 according to the present embodiment loaded therein. The sensor system 10 includes sensors 51 to 54. FIG. 1B is a top view showing a schematic configuration of the fuel cell vehicle 12. FIG. 2 is a circuit block diagram of the sensor system 10.

In FIGS. 1A and 1B, the fuel cell vehicle 12 includes a base frame 14. Front wheels WF, rear wheels WR, and a drive motor 16 that drives the front wheels WF are supported on the base frame 14, either directly or via another structure. Furthermore, a fuel cell stack 18, a first hydrogen tank 20a, a second hydrogen tank 20b, a pipe 21, a battery 19 (high-voltage battery), and the like are supported on the base frame 14, either directly or via another structure. The arrows shown in FIGS. 1A and 1B respectively indicate the front, rear, left, right, up, and down directions.

The fuel cell vehicle 12 includes the battery 19, the drive motor 16, and a fuel cell system. The battery 19 accumulates electricity generated by an electrochemical reaction of the fuel cell stack 18. The drive motor 16 is a travel drive source, and is driven by energy of the battery 19 and/or energy of the fuel cell stack 18. The fuel cell system includes the fuel cell stack 18, the first hydrogen tank 20a, the second hydrogen tank 20b, and an air pump (not shown in the drawings). The fuel cell stack 18 includes an electrolyte electrode assembly, for example, a membrane electrode assembly (MEA) in which a solid polymer electrolyte membrane, in which a thin film of perfluorosulfonic acid is permeated with water, is sandwiched between a cathode and an anode. The first hydrogen tank 20a and the second hydrogen tank 20b supply hydrogen, which is one reactant gas, to the fuel cell stack 18. The air pump supplies an oxygen-containing gas (air), which is the other reactant gas, to the fuel cell stack 18.

The fuel cell vehicle 12 includes a front hood 22, a front window 24, a roof 26, a rear gate 28, a floor board 30, a luggage compartment board 32, a dash panel 34, a front seat 42, a rear seat 44, and the like. A display apparatus 35 such as a multi-information display is attached to the dashboard at the top part of the dash panel 34.

Furthermore, a vehicle ECU 36 (vehicle control ECU) is arranged inside a motor compartment 38 below the front hood 22, along with the fuel cell stack 18 and the drive motor 16. The vehicle ECU 36 manages and controls the sensor system 10 of the fuel cell vehicle 12, and also manages and controls the entire fuel cell vehicle 12. The fuel cell stack 18 is housed inside a hydrogen separation cover 48, in an airtight state.

The battery 19 is arranged between the luggage compartment board 32 under the rear seat 44 and the base frame 14. The first hydrogen tank 20a and the second hydrogen tank 20b are arranged in the front-rear direction between the luggage compartment board 32 under a luggage compartment 46 and the base frame 14. The first hydrogen tank 20a and second hydrogen tank 20b and the fuel cell stack 18 are connected to each other by the pipe (hydrogen flow path) 21 (see FIG. 1A) passing below the floor board 30.

Furthermore, hydrogen sensors 51 to 54, which are gas sensors, are attached at four locations inside the fuel cell vehicle 12. The hydrogen sensors 51 and 52 are attached respectively at positions P1 and P2. The positions P1 and P2 are positions on the upper part of the hydrogen separation cover 48 and below the front hood 22. The hydrogen sensors 51 and 52 sense gas leakage from the fuel cell stack 18. The hydrogen sensors 53 and 54 are attached respectively at positions P3 and P4. The positions P3 and P4 are positions above a region near cutoff valves of the first and second hydrogen tank 20a and 20b and below the luggage compartment board 32. The hydrogen sensors 53 and 54 sense gas leakage respectively from the first hydrogen tank 20a and the second hydrogen tank 20b.

Hydrogen is a gas that is lighter than air. Therefore, in the case where gas (hydrogen) has leaked from the fuel cell stack 18, the first hydrogen tank 20a, or the second hydrogen tank 20b, which is a gas leakage sensing target, the leaked gas stagnates in recessed portions thereabove. Therefore, the hydrogen sensors 51, 52, 53, and 54 are attached at the positions P1, P2, P3, and P4, which are recessed portions (hydrogen pools) that are opened mostly downward.

The vehicle ECU 36 and the hydrogen sensors 51 to 54 each include a calculator having a microcomputer. The microcomputer includes a CPU (Central Processing Unit), a ROM (including an EEPROM) that is a memory, and a RAM (Random Access Memory). In addition, the microcomputer includes an input/output apparatus, such as an A/D converter or a D/A converter, and a timer or the like serving as a timing section. The CPU reads and executes a program stored in the ROM. In this way, the CPU functions as various function realizing sections (function realizing means) such as a control section, a computing section, and a processing section, for example.

As shown in FIG. 2, in the present embodiment, the vehicle ECU 36 includes an ID verifying section 36v and the like as function sections. The hydrogen sensors 51 to 54 include ID setting sections (identifier setting section) 51s, 52s, 53s, and 54s and the like as function sections.

The vehicle ECU 36 and the hydrogen sensors 51 to 54 respectively include rewritable storage sections 36m, 51m, 52m, 53m, and 54m. The storage sections 36m and 51m to 54m are preferably nonvolatile memories. However, the storage sections 36m and 51m to 54m may be volatile memories.

The vehicle ECU 36 and the hydrogen sensors 51 to 54 are connected to each other by a vehicle harness 60.

As shown in FIG. 2, the vehicle harness 60 includes a trunk line 62 serving as a CAN bus (communication bus) and four branch line assemblies 71, 72, 73, and 74. The four branch line assemblies 71, 72, 73, and 74 extend respectively from positions Q1, R2, Q3, and Q4 on the trunk line 62. The positions Q1, R2, Q3, and Q4 on the trunk line 62 are arranged to mostly match the positions P1, P2, P3, and P4 on the fuel cell vehicle 12 when the trunk line 62 is arranged in the fuel cell vehicle 12.

As shown in FIG. 2, the trunk line 62 includes two CAN buses. The trunk line 62 includes a first communication bus CAN1 and a second communication bus CAN2. The hydrogen sensors 51, 53, and 54 are connected to the positions Q1, Q3, and Q4 on the first communication bus CAN1, via the branch line assemblies 71, 73, and 74. The hydrogen sensor 52 is connected to the position R2 on the second communication bus CAN2, via the branch line assembly 72.

The trunk line 62 is not limited to being a CAN bus, and can be replaced with another communication bus such as a LIN bus or a FlexRay bus.

FIG. 3 is a schematic physical wiring diagram of the vehicle harness 60 including the trunk line 62 and branch line assemblies 71 to 74, the vehicle ECU 36, a low-voltage battery 37, and the hydrogen sensors 51 to 54.

The trunk line 62 is formed by a power source line and GND line, which extend from the low-voltage battery 37 (not shown in FIGS. 1A and 1B) arranged inside the motor compartment 38, and the first communication bus CAN1 and second communication bus CAN2 extending from the vehicle ECU 36. The first communication bus CAN1 includes a CAN1-L line and a CAN1-H line. The second communication bus CAN2 includes a CAN2-L line and a CAN2-H line. The branch line assemblies 71 to 74, which respectively include connectors 81 to 84 with leads, are attached at the positions Q1, R2, Q3, and Q4 on the trunk line 62.

The trunk line 62 has the low-voltage battery 37 and vehicle ECU 36 as a starting end (starting point) when arranged within the fuel cell vehicle 12. The trunk line 62 is arranged from the vehicle ECU 36 to the position P1 where the hydrogen sensor 51 is attached. The branch line assembly 71 is arranged at the position Q1 on the first communication bus CAN1. Next, the trunk line 62 is arranged up to the position P2 where the hydrogen sensor 52 is attached. The branch line assembly 72 is arranged at the position R2, which serves as the termination end (termination point) of the second communication bus CAN2. Furthermore, the trunk line 62 is arranged passing below the floor board 30 up to the position P3 where the hydrogen sensor 53 is attached. The branch line assembly 73 is attached to the position Q3 on the first communication bus CAN1. The trunk line 62 is arranged up to the position P4 where the hydrogen sensor 54 is attached. The position Q4 is the termination end (termination point) of the first communication bus CAN1, and the branch line assembly 74 is arranged at this position Q4.

With such an arrangement configuration (wiring configuration), the vehicle ECU 36 is arranged at the starting end (starting point) of the trunk line 62 (transmission line). Termination resistances (not shown in the drawings) for suppressing reflection of the transmission signals (CAN data signals) are attached to the input and output ends of the vehicle ECU 36. Furthermore, the hydrogen sensor 54 is arranged at the termination end (termination point) of the trunk line 62 (transmission line). Termination resistances (not shown in the drawings) for suppressing reflection of the transmission signals (CAN data signals) are attached to the input and output ends of the hydrogen sensor 54.

The branch line assemblies 71 to 74 are attached respectively to the positions Q1, R2, Q3, and Q4 of the trunk line 62. Female 6-pole connectors 81 to 84 are connected to the end portions near the hydrogen sensors 51 to 54 of the branch line assemblies 71 to 74. The hydrogen sensors 51 to 54 are arranged respectively at the positions P1 to P4, which are opposite the positions Q1, R2, Q3, and Q4 on the trunk line 62. The hydrogen sensors 51 to 54 are provided with male 6-pole connectors 51c to 54c. The connectors 81 to 84 of the branch line assemblies 71 to 74 are formed to be freely attachable to and detachable from the connectors 51c to 54c of the hydrogen sensors 51 to 54, respectively.

The 6-pole connectors 81 to 84 of the branch line assemblies 71 to 74 each include a GND-G, a power source P, a CAN-H, a CAN-L, an identifier A, and an identifier B as the female pins (terminals). On the other hand, the 6-pole connectors 51c to 54c of the hydrogen sensors 51 to 54 each include a corresponding GND-G, power source P, CAN-H, CAN-L, identifier A, and identifier B as the male pins (terminals), in a similar manner. The connectors 81 to 84 on the trunk line 62 side and the connectors 51c to 54c on the hydrogen sensors 51 to 54 side are configured to not fit in a reverse (opposite) direction.

As understood from FIG. 3, the connectors 81 to 84 on the branch line assemblies 71 to 74 side according to the present embodiment include at least one identifier pin, in addition to the pins on which the bus line is arranged (the four pins P, G, H, and L in FIG. 3). This is the minimum configuration needed to identify the hydrogen sensors 51 to 54 having the same specifications.

Here, the identification configurations 1 to 4, which are unique to the connectors 81 to 84, and the identifiers set for the hydrogen sensors 51 to 54 will be described.

As shown in FIG. 3, the identifier A pin and GND-G pin of the connector 81 are shorted by a jumper cable or the like serving as a pin-to-pin short-circuit line. The identifier B pin of the connector 81 is not provided with pin-to-pin short-circuit line. Such an identification configuration of the connector 81 is referred to below as Identification Configuration 1.

When the connector 81 having Identification Configuration 1 is fitted to the connector 51c of the hydrogen sensor 51, the identification A pin (identification terminal A) of the connector 51c is connected to the ground potential via a pin-to-pin short-circuit line. The identification A pin of the connector 51c enters the grounded state (GND). The identification B pin (identification terminal B) of the connector 51c is not connected to any potential. The identification B pin of the connector 51c enters the open state (OPEN).

Neither the identification A pin nor the identification B pin of the connector 82 is provided with a pin-to-pin short-circuit line. Such an identification configuration of the connector 82 is referred to below as Identification Configuration 2.

When the connector 82 having Identification Configuration 2 is fit to a connector 52c of the hydrogen sensor 52, neither the identification A pin nor the identification B pin of the connector 52c is connected to a potential. The identification A pin and the identification B pin of the connector 52c each enter the open state (OPEN).

The identification A pin of the connector 83 is not provided with a pin-to-pin short-circuit line. The identification B pin and GND-G pin of the connector 83 are shorted by a pin-to-pin short-circuit line. Such an identification configuration of the connector 83 is referred to below as Identification Configuration 3.

When the connector 83 having Identification Configuration 3 is fit to a connector 53c of the hydrogen sensor 53, the identification A pin of the connector 53c is not connected to any potential. The identification A pin of the connector 53c enters the open state (OPEN). The identification B pin of the connector 53c is connected to the ground potential via a pin-to-pin short-circuit line. The identification B pin of the connector 53c enters the grounded state (GND).

The identification A pin, the identification B pin, and the GND-G pin of the connector 84 are shorted by a pin-to-pin short-circuit line. Such an identification configuration of the connector 84 is referred to below as Identification Configuration 4.

When the connector 84 having Identification Configuration 4 is fit to the connector 54c of the hydrogen sensor 54, the identification A pin and identification B pin of the connector 54c are each connected to the ground potential via a pin-to-pin short-circuit line. The identification A pin and identification B pin of the connector 54c each enter the grounded state (GND).

The CAN-H pins of the connectors 81, 83, and 84 are each connected to the CAN1-H line of the first communication bus CAN1. Therefore, the CAN-H pins of the hydrogen sensors 51, 53, and 54 are each connected to the CAN1-H line of the first communication bus CAN1. The CAN-L pins of the connectors 81, 83, and 84 are each connected to the CAN1-L line of the first communication bus CAN1. Therefore, the CAN-L pins of the hydrogen sensors 51, 53, and 54 are each connected to the CAN1-L line of the first communication bus CAN1.

The CAN-H pin of the connector 82 is connected to the CAN2-H line of the second communication bus CAN2. Therefore, the CAN-H pin of the hydrogen sensor 52 is connected to the CAN2-H line of the second communication bus CAN2. The CAN-L pin of the connector 82 is connected to the CAN2-L line of the second communication bus CAN2. Therefore, the CAN-L pin of the hydrogen sensor 52 is connected to the CAN2-L line of the second communication bus CAN2.

In this way, the insertion position of the jumper line in each of the connectors 81 to 84 is different for each of the branch line assemblies 71 to 74. Therefore, Identification Configurations 1 to 4 of the connectors 81 to 84 differ from each other. Furthermore, the branch line assemblies 71, 73, and 74 are connected to the first communication bus CAN1, and the branch line assembly 72 is connected to the second communication bus CAN2. In other words, hydrogen sensors 51, 53, and 54 are connected to a different communication bus than the hydrogen sensor 52. Due to this, the vehicle ECU 36 can uniquely electrically identify (distinguish among) the hydrogen sensors 51 to 54.

When a power switch (not shown in the drawings) of the fuel cell vehicle 12 is turned ON and the hydrogen sensors 51 to 54 are supplied with power from the low-voltage battery 37, the ID setting sections 51s, 52s, 53s, and 54s of the hydrogen sensors 51 to 54 make the following determination. The ID setting sections 51s, 52s, 53s, and 54s determine the connection states of the identification A pins of the connectors 51c to 54c, based on Identification Configurations 1 to 4. Specifically, the ID setting sections 51s, 52s, 53s, and 54s determine whether the identification A pins are in the grounded state (GND) or the open state (OPEN). In the same manner, the ID setting sections 51s, 52s, 53s, and 54s determine the connection states of the identification B pins of the connectors 51c to 54c, based on Identification Configurations 1 to 4. Specifically, the ID setting sections 51s, 52s, 53s, and 54s determine whether the identification B pins are in the grounded state (GND) or the open state (OPEN). Furthermore, the ID setting sections 51s, 52s, 53s, and 54s determine whether the hydrogen sensors 51 to 54 are connected to the first communication bus CAN1 or connected to the second communication bus CAN2, based on the CAN-H pins and CAN-L pins of the connectors 51c to 54c. In the description below, the CAN-H pins and CAN-L pins of the connectors 51c to 54c may be referred to collectively as communication terminals.

If it is determined that the hydrogen sensors 51, 53, and 54 are connected to the first communication bus CAN1, the ID setting sections 51s, 53s, and 54s set identifiers in a standard format for the connectors 51c, 53c, and 54c. The ID setting sections 51s, 53s, and 54s select the identifiers according to the connection states of the identification A pins and the connection states of the identification B pins of the connectors 51c, 53c, and 54c. The ID setting sections 51s, 53s, and 54s write the selected identifiers to the storage sections 51m, 53m, and 54m.

The standard format is one data frame format (pattern) in the CAN bus. The identifiers with the standard format are expressed by 11-bit data. In the description below, the identifiers in the standard format may be referred to as standard IDs.

On the other hand, if it is determined that the hydrogen sensor 52 is connected to the second communication bus CAN2, the ID setting section 52s sets an identifier in an extended format for the connector 52c. The ID setting section 52s selects the identifier according to the connection state of the identification A pin and the connection state of the identification B pin of the connector 52c. The ID setting section 52s writes the selected identifier to the storage section 52m.

The extended format is one data frame format (pattern) in the CAN bus. The identifiers with the extended format are expressed by 29-bit data. In this regard, the extended format differs from the standard format. In the present embodiment, the vehicle ECU 36 is capable to transmitting and receiving both data frames in the standard format and data frames in the extended format.

Furthermore, the vehicle ECU 36 is capable of recognizing the identifiers in the standard format and the identifiers in the extended format as different identifiers. In the description below, the identifiers in the extended format may be referred to as extended IDs.

FIG. 4 shows one example of a relationship among the identification terminals, the communication buses, and the identifiers set for the hydrogen sensors 51 to 54.

The hydrogen sensor 51 is attached at the position P1 at the top part of the fuel cell stack 18. In the hydrogen sensor 51, the identification A pin (terminal A or identification terminal A) is in the grounded state (GND). The identification B pin (terminal B or identification terminal B) is in the open state (OPEN). The communication terminals of the hydrogen sensor 51 are connected to the first communication bus CAN1. Therefore, an identifier CAN-ID_A in the standard format (standard ID) is written to the storage section 51m of the hydrogen sensor 51.

The hydrogen sensor 52 is attached at the position P2 at the top part of the fuel cell stack 18. In the hydrogen sensor 52, the identification A pin and the identification B pin are in the open state (OPEN). The communication terminals of the hydrogen sensor 52 are connected to the second communication bus CAN2. Therefore, an identifier CAN-EID_A in the extended format (extended ID) is written to the storage section 52m of the hydrogen sensor 52.

The hydrogen sensor 53 is attached at the position P3 at the top part of the first hydrogen tank 20a. In the hydrogen sensor 53, the identification A pin is in the open state (OPEN). The identification B pin is in the grounded state (GND). The communication terminals of the hydrogen sensor 53 are connected to the first communication bus CAN1. Therefore, an identifier CAN-ID_B in the standard format (standard ID) is written to the storage section 53m of the hydrogen sensor 53.

The hydrogen sensor 54 is attached at the position P4 at the top part of the second hydrogen tank 20b. In the hydrogen sensor 54, the identification A pin and the identification B pin are in the grounded state (GND). The communication terminals of the hydrogen sensor 54 are connected to the first communication bus CAN1. Therefore, an identifier CAN-ID_C in the standard format (standard ID) is written to the storage section 54m of the hydrogen sensor 54.

The four hydrogen sensors 51 to 54 are not particularly different from each other, until the identifiers are written to the storage sections 51m to 54m. In other words, the hydrogen sensors 51 to 54 are hydrogen sensors having a single specification (the same specifications), and are suitable for mass production. Therefore, it is possible to reduce the manufacturing cost and component management cost of the hydrogen sensors 51 to 54.

Next, the procedure for setting the identifiers for the hydrogen sensors 51 to 54 in the sensor system 10 according to the present embodiment will be described. A step of attaching the hydrogen sensors 51 to 54 to the fuel cell vehicle 12 is described as an example.

Figure 5:
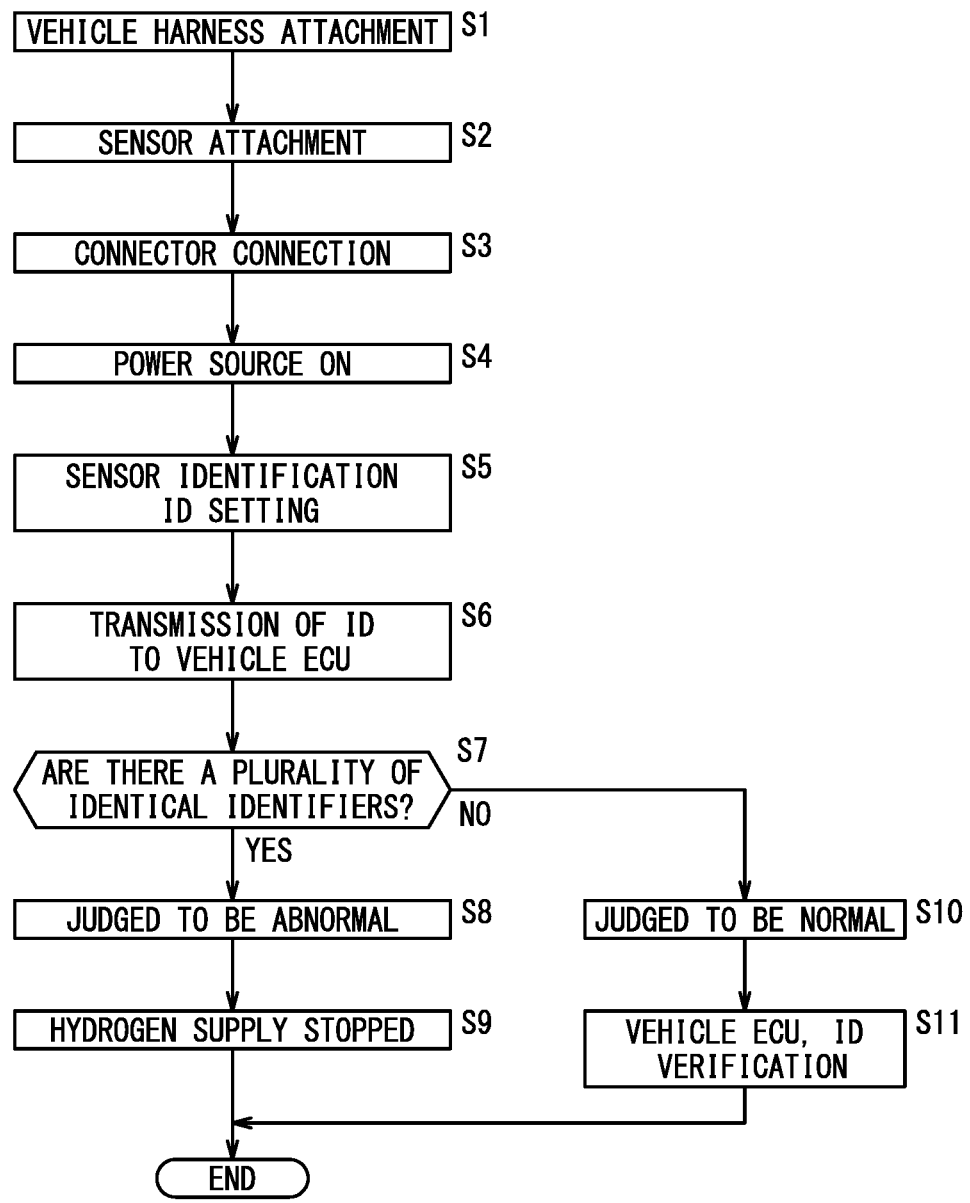
FIG. 5 is a schematic process diagram showing a process of attaching the hydrogen sensors to the vehicle harness.

FIG. 5 schematically shows a step of attaching the hydrogen sensors 51 to 54 to the vehicle harness 60.

In practice, the components other than the vehicle harness 60 (trunk line 62 with the branch line assemblies 71 to 74 attached thereto) and the hydrogen sensors 51 to 54 shown in FIG. 3 are already attached to the fuel cell vehicle 12 before the vehicle harness attachment process of step S1.

In the vehicle harness attachment process of step S1, with the power source of the fuel cell vehicle 12 in the OFF state, the starting end portion of the vehicle harness 60 is attached to the vehicle ECU 36. The remaining portion of the vehicle harness 60 is arranged along the prescribed locations on the fuel cell vehicle 12, as described above. In the present embodiment, the vehicle harness 60 is first arranged such that the branch line assembly 71 at the position Q1 on the trunk line 62 faces the position P1. Next, the vehicle harness 60 is arranged such that the branch line assembly 72 at the position R2 on the trunk line 62 faces the position P2. Furthermore, the vehicle harness 60 is led from the motor compartment 38 toward the rear and downward side, to pass below the floor board 30. The vehicle harness 60 is arranged such that the branch line assemblies 73 and 74 at the positions Q3 and Q4 on the trunk line 62 respectively face the positions P3 and P4. At this point, the wiring of the trunk line 62 of the vehicle harness 60 is completed.

Next, in the sensor attachment process of step S2, the hydrogen sensors 51 to 54 are attached respectively at the positions P1 to P4 inside the fuel cell vehicle 12. In this case, the hydrogen sensors 51 to 54 have the same specifications (a single specification or the same model), and may be attached at any of the positions P1 to P4. Therefore, so-called misassembly does not occur. The hydrogen sensors 51 to 54 may be attached to the fuel cell vehicle 12 before the vehicle harness 60 is attached to the fuel cell vehicle 12.

Next, the connector connection process of step S3 is performed. The hydrogen sensors 51 to 54 are fixed respectively at the positions P1 to P4. The branch line assemblies 71 to 74 are already arranged in the vicinity of the connectors 51*c* to 54*c* of the hydrogen sensors 51 to 54. The connectors 81 to 84 of the branch line assemblies 71 to 74 are respectively fit to the connectors 51*c* to 54*c* of the hydrogen sensors 51 to 54. Due to this, each of the male pins of the connectors 51*c* to 54*c* of the hydrogen sensors 51 to 54 is connected mechanically and electrically to a corresponding female pin of the connectors 81 to 84 of the branch line assemblies 71 to 74.

Furthermore, in the power source ON process of step S4, the power source of the fuel cell vehicle 12 is set to the ON state. Due to this, power is supplied from the low-voltage battery 37 to the vehicle ECU 36. Furthermore, power is supplied from the low-voltage battery 37 to the hydrogen sensors 51 to 54, through the power source line and the GND line of the trunk line 62.

In response to the supply of power, each CPU of the hydrogen sensors 51 to 54 starts an initial setting. The initial setting includes the ID setting process of step S5.

At step S5, the ID setting sections 51*s* to 54*s* of the hydrogen sensors 51 to 54 determine the connection states of the identification A pins and the connection states of the identification B pins of the connectors 51*c* to 54*c*. In other words, the ID setting sections 51*s* to 54*s* determine whether the connection states of the identification A pins are the grounded state (GND) or the open state (OPEN). Furthermore, the ID setting sections 51*s* to 54*s* determine whether the connection states of the identification B pins are the grounded state (GND) or the open state (OPEN). The determination described above made by the ID setting sections 51*s* to 54*s* is based on Identification Configurations 1 to 4 (which pins are shorted to which pins) provided by jumper cables or the like to the connectors 81 to 84 of the branch line assemblies 71 to 74. Furthermore, the ID setting sections 51*s* to 54*s* determine whether the communication bus to which the hydrogen sensors 51 to 54 are connected is the first communication bus CAN1 or the second communication bus CAN2. The determination described above made by the ID setting sections 51*s* to 54*s* is based on the CAN-H pins and the CAN-L pins (communication terminals) of the connectors 51*c* to 54*c*.

The ID setting sections 51*s* to 54*s* set identifiers (IDs) in different formats depending on whether the communication bus connected to the communication terminals is the first communication bus CAN1 or the second communication bus CAN2.

If it is determined that the communication bus connected to the communication terminals is the first communication bus CAN1, the ID setting sections 51*s* to 54*s* set identifiers in the standard format. The ID setting sections 51*s* to 54*s* select the identifiers according to the connection states of the identification A pins and the connection states of the identification B pins. The ID setting sections 51*s* to 54*s* write the selected identifiers to the storage sections 51*m* to 54*m*.

If it is determined that the communication bus connected to the communication terminals is the second communication bus CAN2, the ID setting sections 51*s* to 54*s* set identifiers in the extended format. The ID setting sections 51*s* to 54*s* select the identifiers according to the connection states of the identification A pins and the connection states of the identification B pins. The ID setting sections 51*s* to 54*s* write the selected identifiers to the storage sections 51*m* to 54*m*.

In other words, in the present embodiment, each ID setting section 51*s* to 54*s* sets the identifier (ID) in a format that differs according to the connection state of the identification A pin, the connection state of the identification B pin, and a difference in the communication bus connected to the communication terminals. Each of the connection state of the identification A pin and the connection state of the identification B pin is either the grounded state (GND) or the open state (OPEN). The difference in the communication bus connected to the communication terminals is whether the communication bus connected to the communication terminals is the first communication bus CAN1 or the second communication bus CAN2.

Next, the processing moves to step S6. Step S6 is a process of transmitting the identifiers (IDs) to the vehicle ECU 36. At step S6, the ID setting sections 51*s* to 54*s* of the hydrogen sensors 51 to 54 read the identifiers (IDs), which are unique to the hydrogen sensors 51 to 54, from the storage sections 51*m* to 54*m*. The ID setting sections 51*s* to 54*s* transmit the unique identifiers (IDs) to the vehicle ECU 36 through the trunk line 62.

Next, the processing moves to step S7. The vehicle ECU 36 includes the ID verifying section 36*v*. This ID verifying section 36*v* determines whether a plurality of identical identifiers exist among the identifiers of the hydrogen sensors 51 to 54 received by the vehicle ECU 36.

If it is determined at step S7 that there are a plurality of identical identifiers (step S7: YES), the processing moves to step S8. The vehicle ECU 36 determines that some abnormality has occurred, i.e., one of the hydrogen sensors 51 to 54 is not operating normally.

An abnormality in the hydrogen sensors 51 to 54 is a failure caused by a disconnection of the identification A pin or a disconnection of the identification B pin, for example. When such a failure occurs, the identifier of the failing hydrogen sensor is altered to be the same as an identifier of a normal hydrogen sensor. Therefore, the vehicle ECU 36 cannot distinguish between the failing hydrogen sensor and the normal hydrogen sensor.

Therefore, in a case where the vehicle ECU 36 has determined that there is an abnormality in one of the hydrogen sensors 51 to 54, the processing moves to step S9. The vehicle ECU 36 closes a main stop valve (not shown in the drawings) on the pipe 21. That is, the vehicle ECU 36 cuts off the supply of hydrogen to the fuel cell stack 18.

On the other hand, if it is determined at step S7 that there are no identical identifiers (step S7: NO), the processing moves to step S10. The vehicle ECU 36 determines that each of the hydrogen sensors 51 to 54 is operating normally.

Next, the processing moves to step S11. Step S11 is a process in which the vehicle ECU 36 verifies the identifiers (IDs) of the hydrogen sensors 51 to 54. Identifiers corresponding to the positions Q1, R2, Q3, and Q4 of the trunk line 62 are stored in advance in the storage section 36*m* of the vehicle ECU 36. The ID verifying section 36*v* of the vehicle ECU 36 makes a comparison between the unique identifiers transmitted from the ID setting sections 51*s* to 54*s* of the hydrogen sensors 51 to 54 and the identifiers corresponding to the positions Q1, R2, Q3, and Q4 of the trunk line 62, for checking.

According to the result of this comparison, the vehicle ECU 36 can identify (distinguish among) the identifiers unique to the hydrogen sensors 51 to 54 attached at the positions P1 to P4.

Invention Understandable from the Embodiment

The following is a record of the invention that can be understood from the embodiment described above. Each configurational element is given the reference numeral used in the embodiment described above in order to facilitate understanding, but these configurational elements are not limited to the components given the reference numerals.

The hydrogen sensors (sensors) 51 to 54 according to the present embodiment are connected to the vehicle ECU (control apparatus) 36 via either the first communication bus CAN1 (one communication bus) or the second communication bus CAN2 (another communication bus) formed in the fuel cell vehicle (moving body) 12, and are identified by unique identifiers. Each of the hydrogen sensors 51 to 54 includes a CAN-H pin and a CAN-L pin (communication terminals) that are connected to one of the first communication bus CAN1 and second communication bus CAN2 among the two communication buses and communicates with the vehicle ECU 36; an identification A pin and an identification B pin (identification terminals) that are each set to a connection state that is one of an open state (OPEN) in which the pin is not connected to any potential and a grounded state (GND) in which the pin is connected to a ground potential; and an ID setting section (identifier setting section) 51*s* to 54*s* that sets the identifier of the hydrogen sensor 51 to 54 according to the connection states of the identification A pin and identification B pin and a difference in the communication bus to which the CAN-H and CAN-L pins are connected.

The ID Setting sections 51*s* to 54*s* set the identifiers in different formats according to whether the communication bus to which the CAN-H pins and CAN-L pins are connected is the first communication bus CAN1 or the second communication bus CAN2. The ID setting sections 51*s* to 54*s* set the identifiers in one of a standard format (standard ID) and an extended format (extended ID).

If a failure occurs in the hydrogen sensor 51 attached at the position P1 on the top portion of the fuel cell stack 18 and the identification A pin of the hydrogen sensor 51 becomes disconnected, the connection state of the identification A pin would change from the grounded state (GND) to the open state (OPEN). The connection state of the identification B pin would remain in the open state (OPEN).

In such a case, the identifier of the hydrogen sensor 51 is changed from the identifier CAN-ID_A to the new identifier CAN-ID_D, in response to the change of the connection state of the identification A pin. The new identifier CAN-ID_D is an example of an identifier in the standard format, which is set in a case where the identification A pin and identification B pin are both in the open state (OPEN).

The sensor system 10 includes, in addition to the failing hydrogen sensor 51, the normal hydrogen sensor 52 in which the connection state of the identification A pin is the open state (OPEN) and the connection state of the identification B pin is the open state (OPEN). However, in the present embodiment, the hydrogen sensor 52 is connected to the second communication bus CAN2. Therefore, an identifier CAN-EID_A in the extended format is set for the hydrogen sensor 52.

The vehicle ECU 36 recognizes identifiers in different formats as identifiers that are different from each other. Therefore, the vehicle ECU 36 does not confuse the identifier CAN-ID_D in the standard format of the failing hydrogen sensor 51 with the identifier CAN-EID_A in the extended format of the normal hydrogen sensor 52. Furthermore, the identifier CAN-ID_A used by the hydrogen sensor 51 before the failure is removed from the trunk line 62. Therefore, the vehicle ECU 36 can identify the failure location (the failing hydrogen sensor 51).

In this way, with the hydrogen sensors 51 to 54 according to the present embodiment, it is possible to prevent confusion among the identifiers, even when the number of hydrogen sensors for which identifiers are set is increased.

It should be noted that an identifier in the standard format is preferably not set for a combination in which the identification A pin and identification B pin are both in the open state (OPEN), such as the combination of the identification A pin and identification B pin of the hydrogen sensor 51 after the failure. Due to this, no identifier is set for (assigned to) the failed hydrogen sensor 51. Therefore, the vehicle ECU 36 does not confuse the failed hydrogen sensor 51 with any of the other hydrogen sensors 52 to 54. Furthermore, the identifier CAN-ID_A used for the hydrogen sensor 51 before the failure is removed from the trunk line 62. Accordingly, the vehicle ECU 36 can identify the failure location (failed hydrogen sensor 51).

There is a possibility that the identification A pin of the hydrogen sensor 51 will change from the grounded state (GND) to the open state (OPEN) due to a disconnection or the like. On the other hand, there is only a low possibility of a change occurring in the opposite direction. That is, there is only a low possibility of the identification B pin of the hydrogen sensor 51 changing from the open state (OPEN) to the grounded state (GND) due to a short.

When the identification A pin of the hydrogen sensor 51 fails, the hydrogen sensor 52 has a possibility of having the same combination of connections states for the identification A pin and identification B pin as the failed hydrogen sensor 51. Therefore, in the present embodiment, the hydrogen sensor 51 and the hydrogen sensor 52 are connected to different communication buses from each other. The identifier of the hydrogen sensor 51 is set in a different format than the identifier of the hydrogen sensor 52. Therefore, even if the hydrogen sensor 51 fails, the vehicle ECU 36 can reliably prevent confusion between the failed hydrogen sensor 51 and the normal hydrogen sensor 52.

Furthermore, with the sensor system 10 according to the present embodiment, the plurality of hydrogen sensors include the hydrogen sensor 51 (first gas sensor) that detects hydrogen gas leaking from the fuel cell stack 18 and the hydrogen sensor 52 (second gas sensor) that detects hydrogen gas leaking from the fuel cell stack 18. In this case, either the identification A pin (first terminal) or identification B pin (second terminal) of the hydrogen sensor 51 (first gas sensor) is set to the grounded state (GND) and both of the identification A pin (first terminal) and identification B pin (second terminal) of the hydrogen sensor 52 (second gas sensor) are set to the open state (OPEN).

In the hydrogen sensor 52, the identification A pin and identification B pin are both in the open state (OPEN). Such a hydrogen sensor 52 is not easily affected by disconnections, as described above. Therefore, it is possible to create a redundancy for the function of sensing gas leakage from the fuel cell stack 18 with the two hydrogen sensors 51 and 52. As a result, the detection reliability of the sensor system 10 can be significantly improved.

First Modification

Figure 6:
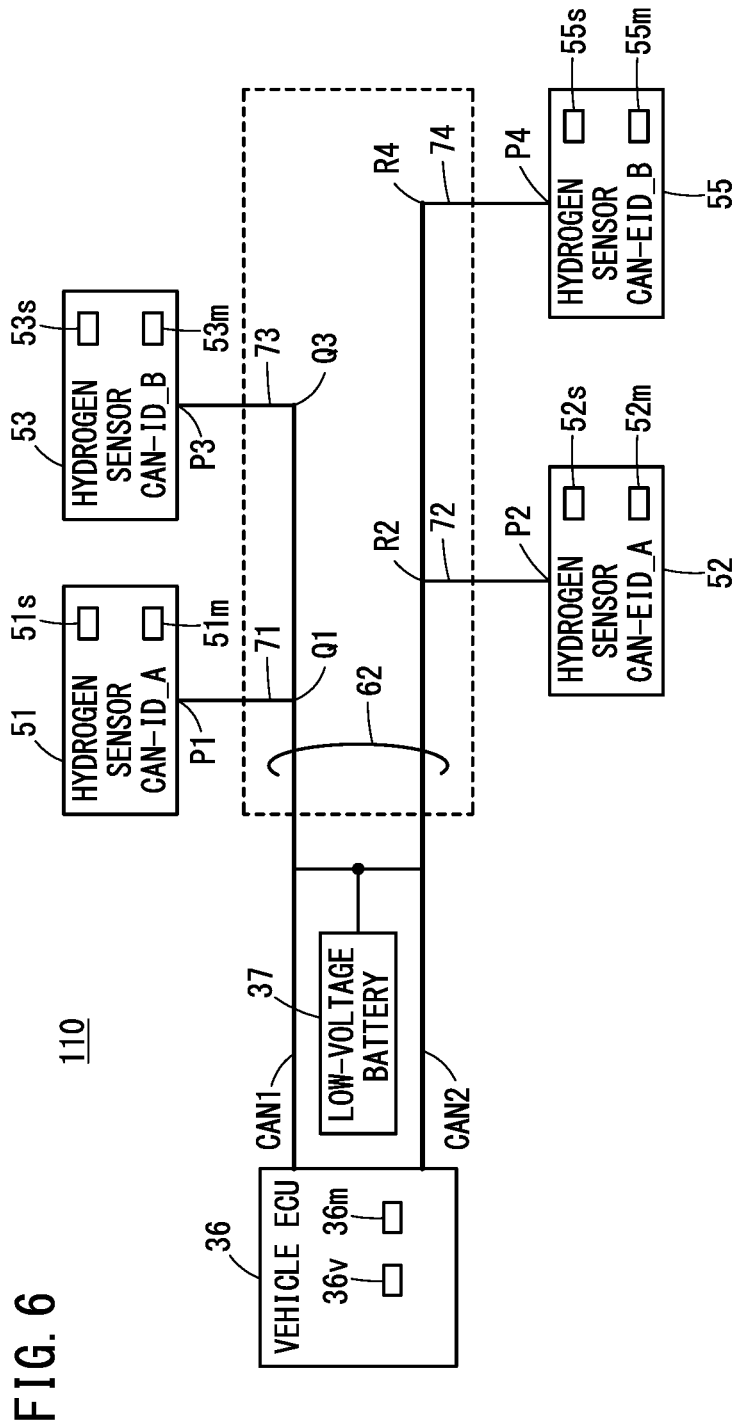
FIG. 6 is a circuit block diagram of a sensor system according to a first modification.
Figure 7:
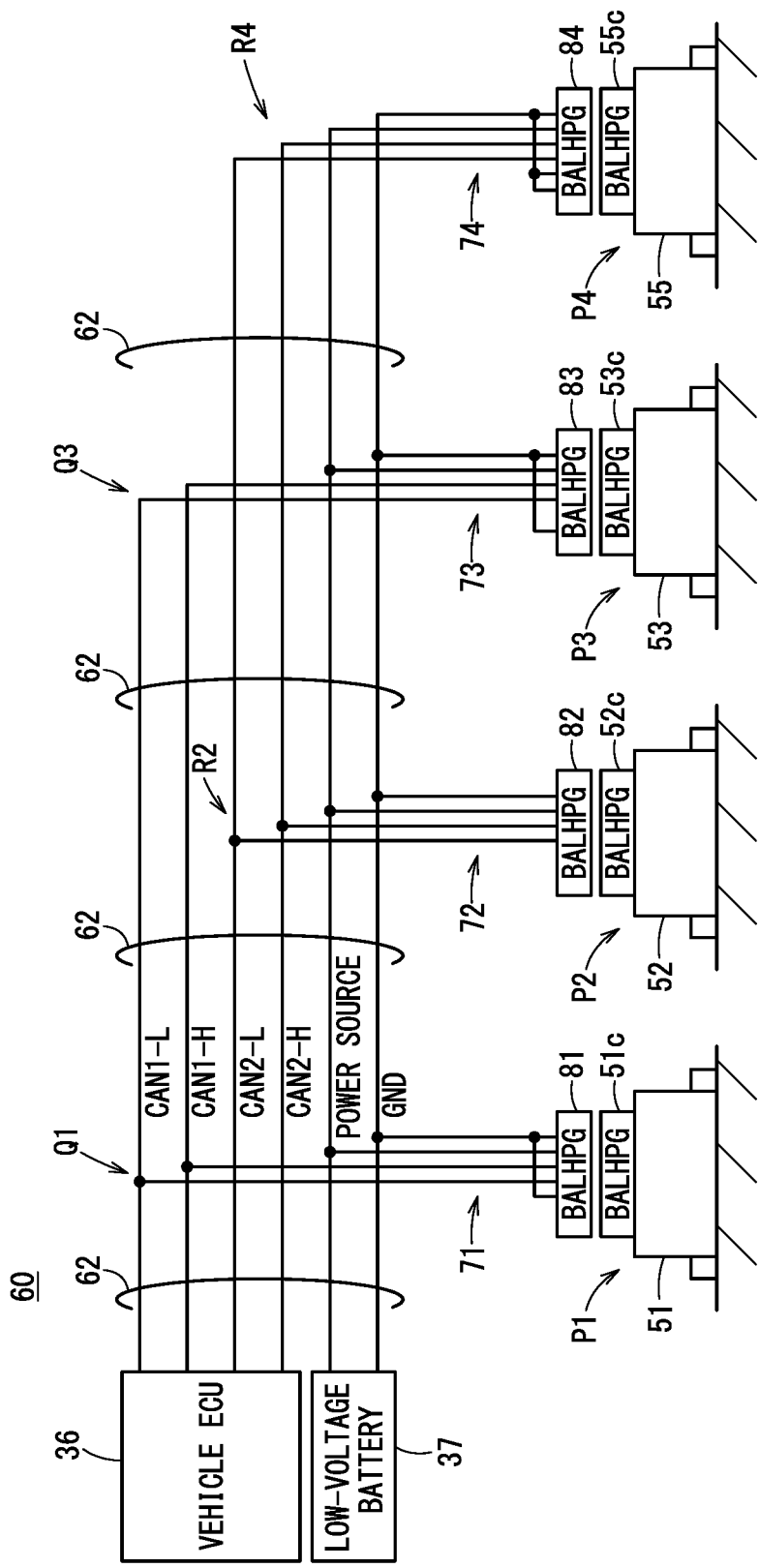
FIG. 7 is a schematic physical wiring diagram of a vehicle harness including a trunk line and branch line assemblies, a vehicle ECU, and hydrogen sensors, according to the first modification.

The following describes a first modification, while referencing FIGS. 6 to 8.

In the embodiment described above, the position where the hydrogen sensor 54 is attached to the first communication bus CAN1 is the position Q4. The first modification shown in FIGS. 6 to 8 differs in that a hydrogen sensor 55 is connected to a position R4 of the second communication bus CAN2.

Elements that are common to the embodiment described above are given reference numerals having the same last two digits in FIGS. 6 to 8, and descriptions thereof are omitted.

As shown in FIG. 8, the hydrogen sensor 55 is attached to the position P4 at the top portion of the second hydrogen tank 20b, similarly to the hydrogen sensor 54. The identification A pin and identification B pin of the hydrogen sensor 55 are both in the grounded state (GND). The communication terminals of the hydrogen sensor 55 are connected to the second communication bus CAN2, and not the first communication bus CAN1. Therefore, an identifier CAN-EID_B in the extended format is written to the storage section 55m of the hydrogen sensor 55. An identifier in the standard format is not written to the storage section 55m of the hydrogen sensor 55.

According to the first modification, even when a failure occurs in any of the hydrogen sensors 51, 52, 53, and 55, it is possible to prevent the identifiers from overlapping (being confused), for all combinations of failing hydrogen sensors and normal hydrogen sensors.

For example, in a case where the identification A pin of the hydrogen sensor 55 is disconnected, the identification A pin of the hydrogen sensor 55 changes to the open state (OPEN). The identification B pin of the hydrogen sensor 55 remains in the grounded state (GND). This combination is the same as that of the identification A pin and identification B pin of the normal hydrogen sensor 53. However, the hydrogen sensor 55 is connected to the second communication bus CAN2, and an identifier in the extended format is set for this hydrogen sensor 55. On the other hand, the identifier CAN-ID_B in the standard format is set for the hydrogen sensor 53. Therefore, the identifier of the hydrogen sensor 55 and the identifier of the hydrogen sensor 53 do not overlap.

Furthermore, in a case where the identification B pin of the hydrogen sensor 55 is disconnected, the identification B pin of the hydrogen sensor 55 changes to the open state (OPEN). The identification A pin of the hydrogen sensor 55 remains in the grounded state (GND). This combination is the same as that of the identification A pin and identification B pin of the normal hydrogen sensor 51. However, the hydrogen sensor 55 is connected to the second communication bus CAN2. An identifier in the extended format is set for this hydrogen sensor 55. On the other hand, the identifier CAN-ID_A in the standard format is set for the hydrogen sensor 51. Therefore, the identifier of the hydrogen sensor 55 and the identifier of the hydrogen sensor 51 do not overlap.

In the hydrogen sensor 51, the connection states of the identification A pin and identification B pin are GND/OPEN. In the hydrogen sensor 53, the connection states of the identification A pin and identification B pin are OPEN/GND. In a case where a 1-bit failure has occurred in either the hydrogen sensor 51 or the hydrogen sensor 53, the connection states of the identification A pin and identification B pin of the hydrogen sensor 51 or the hydrogen sensor 53 change to OPEN/OPEN. In other words, the connection states of the identification A pin and identification B pin of the hydrogen sensor 51 or the hydrogen sensor 53 change to the same combination (OPEN/OPEN) as the hydrogen sensor 52. However, the hydrogen sensor 51 and hydrogen sensor 53 are connected to the first communication bus CAN1, and the identifiers of the hydrogen sensor 51 and hydrogen sensor 53 are set in the standard format. On the other hand, the identifier CAN-EID_A of the hydrogen sensor 52 is set in the extended format. Therefore, the identifiers of the hydrogen sensor 51 and hydrogen sensor 53 do not overlap with the identifier of the hydrogen sensor 52.

In this way, according to the first modification, even when failures occur in any of the four hydrogen sensors 51, 52, 53, and 55, it is possible to prevent the identifiers from overlapping (being confused).

The first modification can be applied not only in a case where the number of identification terminals per sensor is two, but also in a case where the number of identification terminals per sensor is three or more. For a sensor that has three or more identification terminals, if the number of identification terminals in the grounded state (GND) is odd, this sensor is connected to the first communication bus CAN1. The identifier of such a sensor is set in the standard format. For a sensor that has three or more identification terminals, if the number of identification terminals in the grounded state (GND) is even, this sensor is connected to the second communication bus CAN2. Furthermore, for a sensor that has three or more identification terminals, if the number of identification terminals in the grounded state (GND) is zero (all identification terminals are in the open state (OPEN)), this sensor is connected to the second communication bus CAN2. The identifier of such a sensor is set in the extended format. According to such a configuration, even if a 1-bit failure occurs, overlapping (confusion) of the identifiers between failing sensors and normal sensors is prevented. Compared to the prior art, it is possible to increase the number of sensors for which identifiers can be set.

Second Modification

The second modification will be described while referencing FIGS. 9 and 10.

Figure 9:
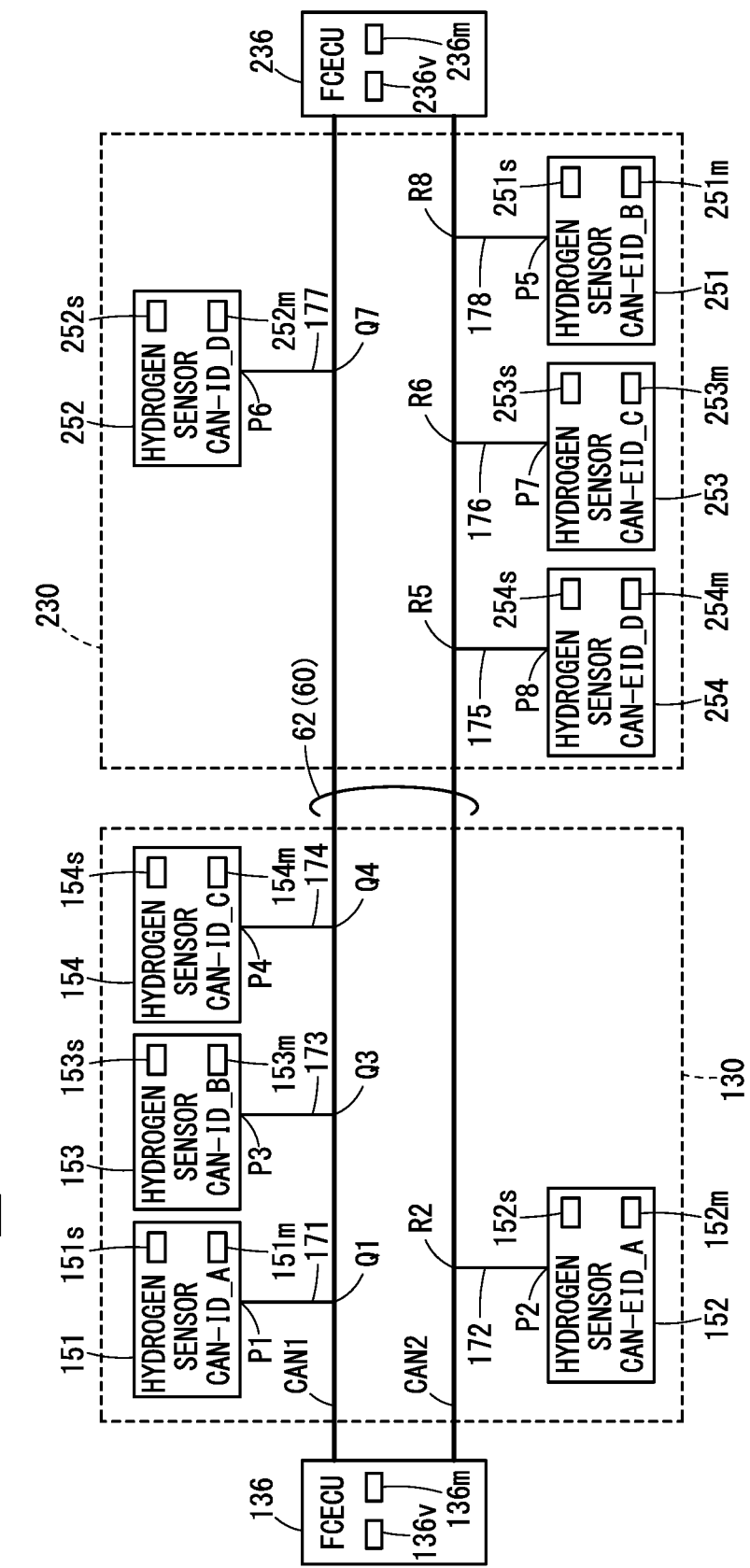
FIG. 9 is a circuit block diagram of a sensor system according to a second modification.

In the second modification, elements that are common to the embodiment and first modification described above are given reference numerals having the same last two digits in FIGS. 9 and 10, and descriptions thereof are omitted.

The second modification is intended to be applied to a large-scale vehicle such as a truck or bus in which a plurality of fuel cell stacks are loaded.

In the embodiment described above, four hydrogen sensors 51 to 54 are connected to the trunk line 62 (first communication bus CAN1 and second communication bus CAN2). The second modification shown in FIGS. 9 and 10 differs in that eight hydrogen sensors 151 to 154 and 251 to 254 are connected to the trunk line 62.

The sensor system 210 in the second modification includes two control apparatuses (ECUs).

As shown in FIGS. 9 and 10, an FCECU 136, which is a first one of the control apparatuses (ECUs), controls a first control target 130. The first control target 130 includes a first fuel cell stack 118, a first hydrogen tank 120a, and a second hydrogen tank 120b.

An FCECU 236, which is a second one of the control apparatuses (ECUs), controls a second control target 230. The second control target 230 includes a second fuel cell stack 218, a third hydrogen tank 220a, and a fourth hydrogen tank 220b.

The following describes the hydrogen sensors 151 to 154. The hydrogen sensors 151 to 154 are respectively arranged at a position P1 on a top portion of the first fuel cell stack 118, a position P2 on a top portion of the first fuel cell stack 118, a position P3 on a top portion of the first hydrogen tank 120a, and a position P4 on a top portion of the second hydrogen tank 120b. The hydrogen sensors 151 to 154 communicate with the FCECU 136. In the following description, the hydrogen sensors 151 to 154 may be referred to collectively as a first sensor group.

As shown in FIG. 9, among the hydrogen sensors 151 to 154, the hydrogen sensors 151, 153, and 154 are connected to positions Q1, Q3, and Q4 of the first communication bus CAN1. The hydrogen sensor 152 is connected to the position R2 of the second communication bus CAN2. In FIG. 9, the low-voltage battery 37 is not shown in the drawing.

The connection states of the identification A pins and identification B pins of the hydrogen sensors 151 to 154 are respectively GND/OPEN, OPEN/OPEN, OPEN/GND, and GND/GND, as shown in FIG. 10. The arrangement configuration (wiring configuration) of the FCECU 136 and the hydrogen sensors 151 to 154 is the same as in FIG. 3 in the embodiment described above, and is thus not shown in a drawing.

The following describes the hydrogen sensors 251 to 254. The hydrogen sensors 251 to 254 are respectively attached at a position P5 on a top portion of the second fuel cell stack 218, a position P6 on a top portion of the second fuel cell stack 218, a position P7 on a top portion of the third hydrogen tank 220a, and a position P8 on a top portion of the fourth hydrogen tank 220b. The hydrogen sensors 251 to 254 communicate with the FCECU 236. In the following description, the hydrogen sensors 251 to 254 may be referred to collectively as a second sensor group.

As shown in FIG. 9, among the hydrogen sensors 251 to 254, the hydrogen sensors 251, 253, and 254 are connected respectively to positions R8, R6, and R5 of the second communication bus CAN2. The hydrogen sensor 252 is connected to the position Q7 of the first communication bus CAN1.

The connection states of the identification A pins and identification B pins of the hydrogen sensors 251 to 254 are respectively GND/OPEN, OPEN/OPEN, OPEN/GND, and GND/GND, as shown in FIG. 10. It should be noted that the arrangement configuration (wiring configuration) of the FCECU 236 and the hydrogen sensors 251 to 254 can be obtained if the correspondence relationship between the communication buses to which the communication terminals are connected and the connections states of the identification A pins and identification B pins are switched in the arrangement configuration (wiring configuration) of the hydrogen sensors 151 to 154. Therefore, the arrangement configuration (wiring configuration) of the FCECU 236 and the hydrogen sensors 251 to 254 is not shown in a drawing.

For the hydrogen sensors (sensors) 151 to 154 and 251 to 254 according to the second modification, the control apparatus (ECU) includes the FCECU 136 (first control apparatus) that controls the first control target 130 and the FCECU 236 (second control apparatus) that controls the second control target 230. The correspondence relationship between the communication bus (first communication bus CAN1 or second communication bus CAN2) to which the communication terminals are connected and the connection states (GND or OPEN) of the identification A pins and identification B pins (identification terminals) is interchanged, between a case where the hydrogen sensors 151 to 154 and 251 to 254 are included in the first sensor group that communicates with the FCECU 136 and a case where the hydrogen sensors 151 to 154 and 251 to 254 are included in the second sensor group that communicates with the FCECU 236.

According to such a configuration, an identifier in the standard format or an identifier in the extended format is set for each of the hydrogen sensors 151 to 154 and 251 to 254. Therefore, it is possible to create a redundancy whereby the gas leak sensing of the hydrogen sensors 151 to 154 in the first sensor group and the gas leak sensing of the hydrogen sensors 251 to 254 in the second sensor group can be made redundant at the same time.

As an example, a case is envisioned in which, among the eight hydrogen sensors 151 to 154 and 251 to 254, a failure such as a disconnection of the identification A pin in the hydrogen sensor 151 has occurred. This hydrogen sensor 151 serves to sense gas leakage from the first fuel cell stack 118. When the hydrogen sensor 151 fails, the combination of the connection state of the identification A pin and the connection state of the identification B pin of the hydrogen sensor 151 becomes OPEN/OPEN. The hydrogen sensor 151 is connected to the first communication bus CAN1. Therefore, the identifier of the hydrogen sensor 151 after the failure changes to CAN-ID_D, which is the same as the identifier of the hydrogen sensor 152. The hydrogen sensor 252 serves to sense the gas leakage from the second fuel cell stack 218.

In this case, the FCECU 136 utilizes the detection result of the hydrogen sensor 152, which is attached at the position P2 and not failing, in order to sense gas leakage from the first fuel cell stack 118. The FCECU 236 utilizes only the detection result of the hydrogen sensor 251 attached at the position P5 in order to sense gas leakage from the second fuel cell stack 218. Therefore, the sensor system 210 according to the second modification can continue sensing gas leakage.

In the embodiment and modifications described above, the fuel cell vehicle 12 was used as an example, but the moving body to which the sensors and sensor system of the present invention can be applied is not limited to the fuel cell vehicle 12. The sensors and sensor system of the present invention can also be applied to other moving bodies such as four-wheel vehicles, two-wheel vehicles, aircraft, drones, ships, trains, and the like that use an internal combustion engine or secondary battery as a drive source.

Furthermore, in the embodiment and modifications described above, the identifiers are set in different formats (standard format or extended format) based on the communication bus to which the sensor is connected. However, there are cases where it is possible to prevent confusion among the identifiers even when the identifiers are set in the same format (the standard format, for example) for each of a plurality of sensors connected to the first communication bus CAN1 and a plurality of sensors connected to the second communication bus CAN2.

As an example, two sensors are connected to the first communication bus CAN1. The identification terminals (identification A pin and identification B pin) of these two sensors are respectively GND/OPEN and OPEN/GND. The identifiers are set in the standard format for these two sensors. Two new sensors are connected to the second communication bus CAN2. The identification terminals of these two sensors are respectively GND/OPEN and OPEN/GND. The identifiers are set in the standard format for these two sensors as well. In this case, no matter which sensor a 1-bit failure occurs in, it is possible to prevent confusion among the identifiers.

The present invention is not limited to the above-described embodiments, and it goes without saying that various alternative or additional configurations could be adopted therein without departing from the scope of the present invention.

What is claimed is:

1. A sensor that is connected to a control apparatus via one of two communication buses formed in a moving body and is identified by a unique identifier, the sensor comprising:
a communication terminal that is connected to either one communication bus or another communication bus of the two communication buses, and communicates with the control apparatus;
a plurality of identification terminals each having a connection state that is one of an open state in which the identification terminal is not connected to any potential and a grounded state in which the identification terminal is connected to a ground potential; and
an identifier setting section comprising one or more processors that execute computer-executable instructions stored in a memory, wherein the one or more processors execute the computer-executable instructions to cause the identifier setting section to set the identifier of the sensor according to the connection states of the plurality of identification terminals and a difference in the communication bus to which the communication terminal is connected, wherein:
the one or more processors execute the computer-executable instructions to cause the identifier setting section to set the identifier with a different pattern according to whether the communication bus to which the communication terminal is connected is the one communication bus or the other communication bus,
the control apparatus includes a first control apparatus that controls a first control target and a second control apparatus that controls a second control target; and
between a case where the sensor is included in a first sensor group that communicates with the first control apparatus and a case where the sensor is included in a second sensor group that communicates with the second control apparatus, a correspondence relationship between the communication bus to which the communication terminal is connected and the connection states of the identification terminals is interchanged.

2. The sensor according to claim 1, wherein:
the identification terminals includes a first terminal and a second terminal;
the communication terminal is connected to the one communication bus if either the first terminal or the second terminal is in the grounded state; and
the communication terminal is connected to the other communication bus if the first terminal and the second terminal are both in the open state.

3. A sensor system that includes a plurality of the sensors according to claim 2, wherein:
the plurality of sensors include a first gas sensor that detects gas leaking from a fuel cell stack and a second gas sensor that detects the gas leaking from the fuel cell stack;
either the first terminal or the second terminal of the first gas sensor is set to the grounded state; and
both the first terminal and the second terminal of the second gas sensor are set to the open state.

4. A sensor that is connected to a control apparatus via one of two communication buses formed in a moving body and is identified by a unique identifier, the sensor comprising:
a communication terminal that is connected to either one communication bus or another communication bus of the two communication buses, and communicates with the control apparatus;
a ground terminal connected to a ground line extended from a battery;
a plurality of identification terminals each having a connection state that is one of an open state in which the identification terminal is not connected to any potential and a grounded state in which the identification terminal is connected to a ground potential;
a pin-to-pin short-circuit line configured to cause at least one of the plurality of identification terminals and the ground terminal to be shorted; and
an identifier setting section comprising one or more processors that execute computer-executable instructions stored in a memory, wherein the one or more processors execute the computer-executable instructions to cause the identifier setting section to set the identifier of the sensor according to whether the connection states of the plurality of identification terminals are respectively open or grounded, wherein each of the plurality of identification terminals connected to the ground terminal via the pin-to-pin short-circuit line is regarded as being grounded, wherein:
the one or more processors execute the computer-executable instructions to cause the identifier setting section to set the identifier with a different pattern according to whether the communication bus to which the communication terminal is connected is the one communication bus or the other communication bus.

* * * * *